US011483303B2

(12) United States Patent
Kwon et al.

(10) Patent No.: US 11,483,303 B2
(45) Date of Patent: Oct. 25, 2022

(54) BLOCKCHAIN-BASED ONE ID SERVICE SYSTEM AND METHOD

(71) Applicant: SK HOLDINGS CO., LTD., Seoul (KR)

(72) Inventors: Yong Min Kwon, Uiwang-si (KR); Kyong Gu Kang, Seongnam-si (KR); Da Woon Lee, Yongin-si (KR)

(73) Assignee: SK HOLDINGS CO., LTD., Seoul (KR)

( * ) Notice: Subject to any disclaimer, the term of this patent is extended or adjusted under 35 U.S.C. 154(b) by 386 days.

(21) Appl. No.: 16/638,959

(22) PCT Filed: Aug. 20, 2018

(86) PCT No.: PCT/KR2018/009518
§ 371 (c)(1),
(2) Date: Feb. 13, 2020

(87) PCT Pub. No.: WO2019/039811
PCT Pub. Date: Feb. 28, 2019

(65) Prior Publication Data
US 2020/0195629 A1    Jun. 18, 2020

(30) Foreign Application Priority Data
Aug. 23, 2017    (KR) .......................... 10-2017-0106439

(51) Int. Cl.
*H04L 29/06*    (2006.01)
*H04L 9/40*    (2022.01)
(Continued)

(52) U.S. Cl.
CPC ........ *H04L 63/0815* (2013.01); *H04L 9/0637* (2013.01); *H04L 63/083* (2013.01);
(Continued)

(58) Field of Classification Search
None
See application file for complete search history.

(56) References Cited

U.S. PATENT DOCUMENTS

| 8,590,027 B2 | 11/2013 | Rowley |
| 2004/0117383 A1* | 6/2004 | Lee ........................ G06Q 30/00 |
| 2017/0149560 A1 | 5/2017 | Shah |

FOREIGN PATENT DOCUMENTS

| CN | 104038503 A | 9/2014 |
| EP | 1 613 017 A1 | 1/2006 |

(Continued)

OTHER PUBLICATIONS

Zhang et al., "Poster: Towards Fully Distributed User Authentication with Blockchain", IEEE, Symposiumon Privacy-Aware Computing, Aug. 2017, pp. 202-203 (Year: 2017).*

(Continued)

*Primary Examiner* — Andrew J Steinle
(74) *Attorney, Agent, or Firm* — Sughrue Mion, PLLC

(57) ABSTRACT

Provided are a blockchain-based one ID service system and method, in an authentication method according to the embodiment of present invention, an authentication support server maps and registers a first ID issued by a first SP server to a first user and a first site of the first SP server, which is an issuing server, and, upon receiving the first ID from a second SP server, the authentication support server returns information on the first site mapped to the first ID to the second SP server. To this end, there is no need for a separate server configuration to perform an authentication procedure, and it is possible to lessen the burden of performing authentication for SPs.

14 Claims, 11 Drawing Sheets

(51) Int. Cl.
  *H04L 9/06* (2006.01)
  *H04W 12/06* (2021.01)
  *H04L 67/563* (2022.01)
  *H04L 9/00* (2022.01)

(52) U.S. Cl.
  CPC ........ *H04L 63/0884* (2013.01); *H04L 67/563* (2022.05); *H04W 12/06* (2013.01); *H04L 9/50* (2022.05)

(56) References Cited

FOREIGN PATENT DOCUMENTS

| | | |
|---|---|---|
| EP | 2 246 800 A1 | 11/2010 |
| JP | 2004-342088 A | 12/2004 |
| KR | 10-0921171 B1 | 10/2009 |
| KR | 100921171 B1 * | 10/2009 |
| KR | 10-2010-0090890 A | 8/2010 |

OTHER PUBLICATIONS

Lin Zhang et al., "Poster: Towards Fully Distributed User Authentication with Blockchain", IEEE, Symposium on Privacy-Aware Computing, Aug. 2017, pp. 202-203.
Communication dated Mar. 16, 2021, issued by the European Patent Office in counterpart European Application No. 18847854.9.
Communication dated Mar. 28, 2019, issued by the Korean Intellectual Property Office in counterpart Korean Application No. 10-2017-0106439.
Weili Huang & Lina Zuo, "Research of a New Type Web Single Sign-on Program", Journal of Information & Computational Science 5: 3, 2008, pp. 1407-1413 (Total 7 pages).
Yun Deng et al., "System Design of Mobile Cross-domain Single Sign-on", Computer Engineering and Design, 2010, 31(8), pp. 1667-1672.
Communication dated Sep. 3, 2021, issued by the Chinese Patent Office in counterpart Chinese Application No. 201880054632.2.
Communication dated Mar. 18, 2021 by the Japanese Patent Office in application No. 2020-509448.
Communication dated Apr. 6, 2022, issued by the Chinese Patent Office in counterpart Chinese Application No. 201880054632.2.

* cited by examiner

| Name | Address | Birth Date | MDN | one ID | one PW |
|---|---|---|---|---|---|
| Hong Gil-dong | Bundang-gu, Seongnam-si, Gyeonggi-do | 940101 | 01088889999 | 01088889999@kr | sdfg*#7537 |
| | | | | | |
| | | | | | |
| | | | | | |

FIG. 3

| one ID | Authentication Site | one PW |
|---|---|---|
| 01088889999@kr | S-telecommunication company | sdfg*#7537 |
| | | |
| | | |
| | | |

FIG. 4

| one ID | Authentication Site | Login Time | Logged in Site |
|---|---|---|---|
| 01088889999@kr | S-telecommunication company | 20170530 13:58:27<br>20170601 17:38:22 | A-shop<br>L-card |
| | | | |
| | | | |
| | | | |

FIG. 9

| Name | Address | Birth Date | MDN | one ID | one PW |
|---|---|---|---|---|---|
| Hong Gil-dong | Bundang-gu, Seongnam-si, Gyeonggi-do | 940101 | 01088889999<br>↓<br>01055556666 | 01088889999@kr | sdfg*#7537 |
| | | | | | |
| | | | | | |
| | | | | | |

FIG. 10

| Name | Address | Birth Date | MDN | one ID | one PW |
|---|---|---|---|---|---|
| Hong Gil-dong | Bundang-gu, Seongnam-si, Gyeonggi-do | 940101 | 01055556666 | ~~01088889999@kr~~ ↓ 01055556666@kr | sdfg*#7537 |
| | | | | | |
| | | | | | |
| | | | | | |

FIG. 11

| one ID | Authentication Site | one PW |
|---|---|---|
| ~~01088889999@kr~~ ↓ 01055556666@kr | S-telecommunication company | sdfg*#7537 |
| | | |
| | | |
| | | |

FIG. 12

BLOCKCHAIN-BASED ONE ID SERVICE SYSTEM AND METHOD

TECHNICAL FIELD

The present disclosure relates to personal authentication-related technology, and more particularly, to a system and a method for authentication which is required to log in to a plurality of sites with one ID.

BACKGROUND ART

Typically, in order to use a plurality of services provided by a plurality of sites, respectively, a user should repeat a membership subscription procedure for each site, and should enter personal information, be issued an ID for each site, and set a password (PW).

However, this procedure requires much time and effort of the user, and the user should remember and manage the ID/PW, which causes inconvenience. This problem may become worse when a different ID/PW is used for each site.

From the point of view of a service provider (SP), holding/managing personal information of members may cause burdens due to its difficulty and frequent security accident, and may cost much.

As a solution to these problems, technology for logging in to a plurality of sites with one ID has been developed. However, this technology requires a separate server for authentication, and is not effective since it is difficult to effectively manage the authentication server.

DISCLOSURE

Technical Problem

The present disclosure has been developed in order to address the above-discussed deficiencies of the prior art, and an object of the present disclosure is to provide a blockchain-based ID service system and method, by which a specific SP to which a user subscribes from among SPs issues an ID for logging in to all of the other SPs and registers die ID at a blockchain network, and the SP having issued the ID is in charge of an authentication procedure for logging in to the oilier SPs.

Technical Solution

According to an embodiment of the present disclosure to achieve the above-described object, an authentication method includes: mapping and registering, by an authentication supporting server, 'a first ID issued to a first user by a first SP server' from among a plurality of SP servers, and 'a first site of the first SP server which is an issuance server'; and, when the authentication supporting server receives the first ID from a second SP server from among the plurality of SP servers, returning information regarding the first site mapped onto the first II) to the second SP server.

The first ID may be an ID which is used to log in to sites provided by the plurality of SP servers.

The first user may be a member of die first site, but may not be a member of a second site provided by the second SP server.

The first user may be a member of the first site, and the first SP server may automatically generate the first ID by using customer information of the first user owned by the first SP server.

When the customer information of the first user used to generate the first ID is changed, the first SP server may change the first ID according to the changed customer information, and the authentication method may further include receiving, by the authentication supporting server, the changed first ID from the first SP server, and replacing the existing first ID with the changed first ID.

The first SP server may register the first ID and a PW set by the first user at its own DB, and may perform an authentication procedure for logging in to a second site of the second SP server using die first ID with reference to the DB.

The second SP server may redirect a mobile terminal of the first user to a login page of the first site to log in to the second site by using the first ID, and the first SP server may redirect the mobile terminal of the first user to the second site after performing the authentication procedure.

When authentication succeeds, the first SP server may transmit the owned customer information of the first user to ti e second SP server through die mobile terminal of the first user which is redirected to the second site.

The authentication method according to an embodiment of the present disclosure may further include recording, by the authentication supporting server, a login history using die first ID received from the second SP server.

The authentication method according to an embodiment of the present disclosure may further include: mapping and registering, by the authentication supporting server, 'a second ID issued to a second user by the second SP server' and 'a second site of the second SP server which is an issuance server'; and, when the authentication supporting server receives the second ID from the first SP server, returning information regarding the second site mapped onto the second ID to the first SP server.

The authentication supporting server may be a server constituting a blockchain network.

According to another embodiment of the present disclosure, an authentication supporting server may include: a communication unit configured to connect communication with a plurality of SP servers, and a processor configured to map and register 'a first ID issued to a first user by a first SP server' from among the plurality of SP servers, and 'a first site of the first SP server which is an issuance server,' and, when the first ID is received from a second SP server from among the plurality of SP servers through the communication unit, to return information regarding the first site mapped onto the first ID to the second SP server through the communication unit.

According to another embodiment of the present disclosure, an authentication method may include: a mobile terminal being issued an ID from a first SP server from among a plurality of SP servers: and requesting, by the mobile terminal, login to a second site of a second SP server from among the plurality of SP servers with the issued ID, and the ID may be mapped onto a first site of the first SP server which is an issuance server, and may be registered at an authentication supporting server, and the second SP server may receive information regarding the first site mapped onto the ID from the authentication supporting server, and may request the first site to perform authentication necessary for logging in to the second site.

According to another embodiment of the present disclosure, a mobile terminal may include a communication unit configured to connect communication with a plurality of SP servers; and a processor configured to be issued an ID from a first SP server from among the plurality of SP servers, and to request login to a second site of a second SP server from among the plurality of SP servers with the issued ID, and the ID may be mapped onto a first site of the first SP server which is an issuance server, and may be registered at an authentication supporting server, and the second SP server may be configured to receive information regarding the first site mapped onto the ID from the authentication supporting server, and to request the first site to perform authentication necessary for logging in to the second site.

Advantageous Effects

According to embodiments of the present disclosure as described above, a specific SP to which a user subscribes from among SPs issues an ID for logging in to all of the other SPs and registers the ID at a blockchain network, and the SP having issued the ID is in charge of an authentication procedure for logging in to the other SPs. Accordingly, a separate server configured to perform an authentication procedure is not required, and authentication performance burdens to the SPs can be reduced.

In addition, according to various embodiments of the present disclosure, an ID can be automatically generated based on personal information of a user owned by an SP, and also, the ID can be automatically changed in association with change of the personal information. Accordingly, convenience of both of the user and the SP can be enhanced.

DESCRIPTION OF DRAWINGS

FIG. 3 is a view illustrating a user customer information DB;

FIG. 4 is a view illustrating an ID-authentication site mapping DB;

FIG. 9 is a view illustrating an ID-authentication site mapping DB on which a login history is recorded;

FIGS. 10 to 12 are views provided to explain a process of processing one ID change in association with MDN change;

BEST MODE

Hereinafter, the present disclosure will be described in detail with reference to the accompanying drawings.

1. Blockchain-Based One ID Service System

Embodiments of the present disclosure suggest a system and a method for a one ID service. The "one ID service" refers to a service that enables a user to log in by accessing a plurality of sites with one ID.

Herein, one ID used in the one ID service may be issued at any one of the plurality of sites, and a user has an option of selecting a site for issuing an ID. However, the user is required to subscribe to the site issuing the one ID as a member.

The user who is issued the one ID may log in to sites of affiliates of the one ID sen ice with the one ID. An authentication procedure is performed in the site having issued the one ID rather than in a site of an affiliate that the user wishes to log in to. Accordingly, when the user is issued the one ID, the user can log in to the sites of the affiliates without subscribing thereto.

However, even when the site that the user wishes to log in to is the site having issued the one ID, the site that the user wishes to log in to and the site performing the authentication procedure are the same.

The site that has issued the one ID should be registered as a site for performing the authentication procedure for logging in with the one ID. This is registered at a blockchain network. It means that information regarding the site that is to perform the authentication procedure by the one ID can be obtained from the blockchain network.

Figure 1:
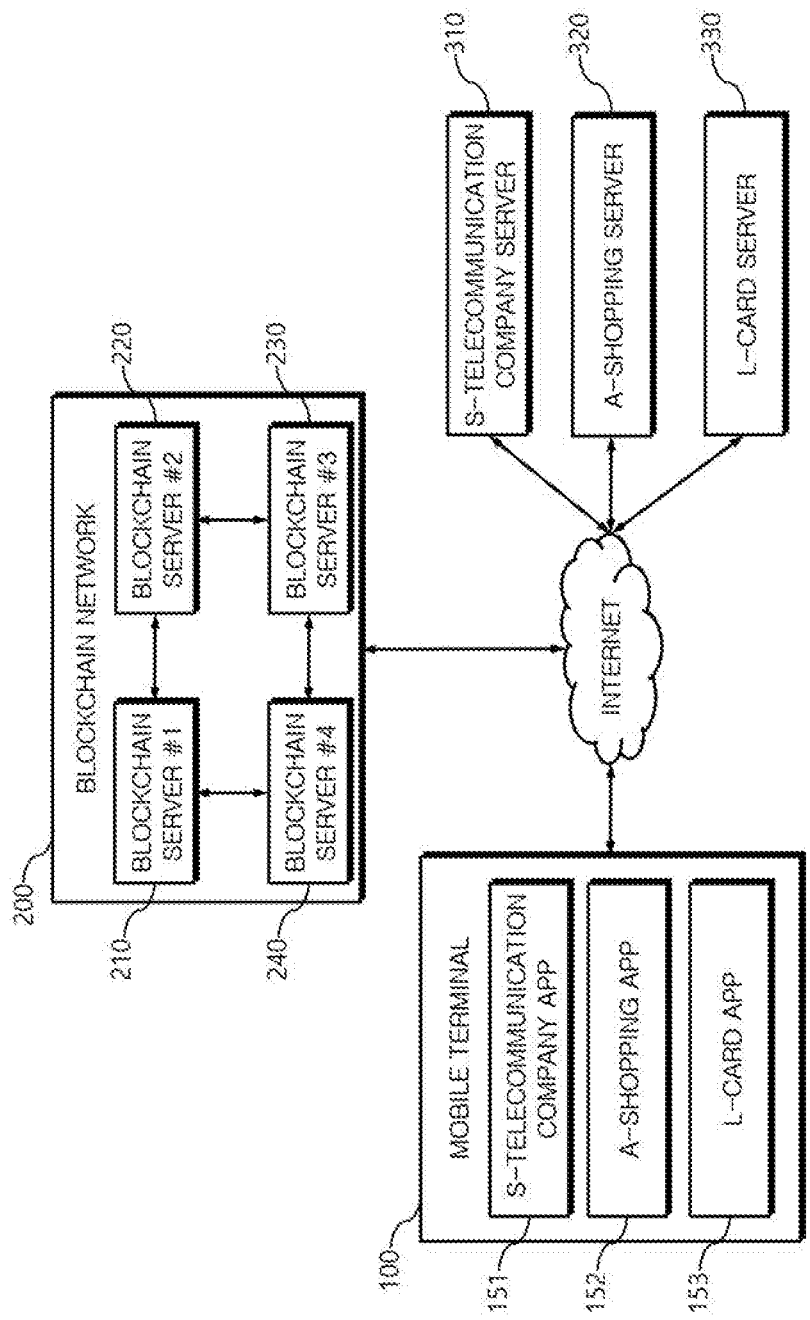
FIG. 1 is a view illustrating a blockchain-based one ID service system according to an embodiment of the present disclosure.

FIG. 1 is a view illustrating a blockchain-based one ID service system according to an embodiment of the present disclosure. The blockchain-based one ID service system according to an embodiment of the present disclosure is established by including a mobile terminal 100, a blockchain network 200, and service provider (SP) servers 310, 320, 330, as shown in FIG. 1.

The SP servers 310, 320, 330 are servers that affiliates of the one ID service manage to provide their own sites.

The mobile terminal 100 may have applications (APPs) 151, 152, 153 installed therein to access sites provided by the SP servers 310, 320, 330 and to receive services.

The blockchain network 200 is established with a plurality of blockchain servers 210, 220, 230, 240 distributed therein, and provides the one ID service to the user of the mobile terminal 100 in cooperation with tie SP servers 310, 320, 330.

2. One ID Issuance/Registration

Figure 2:
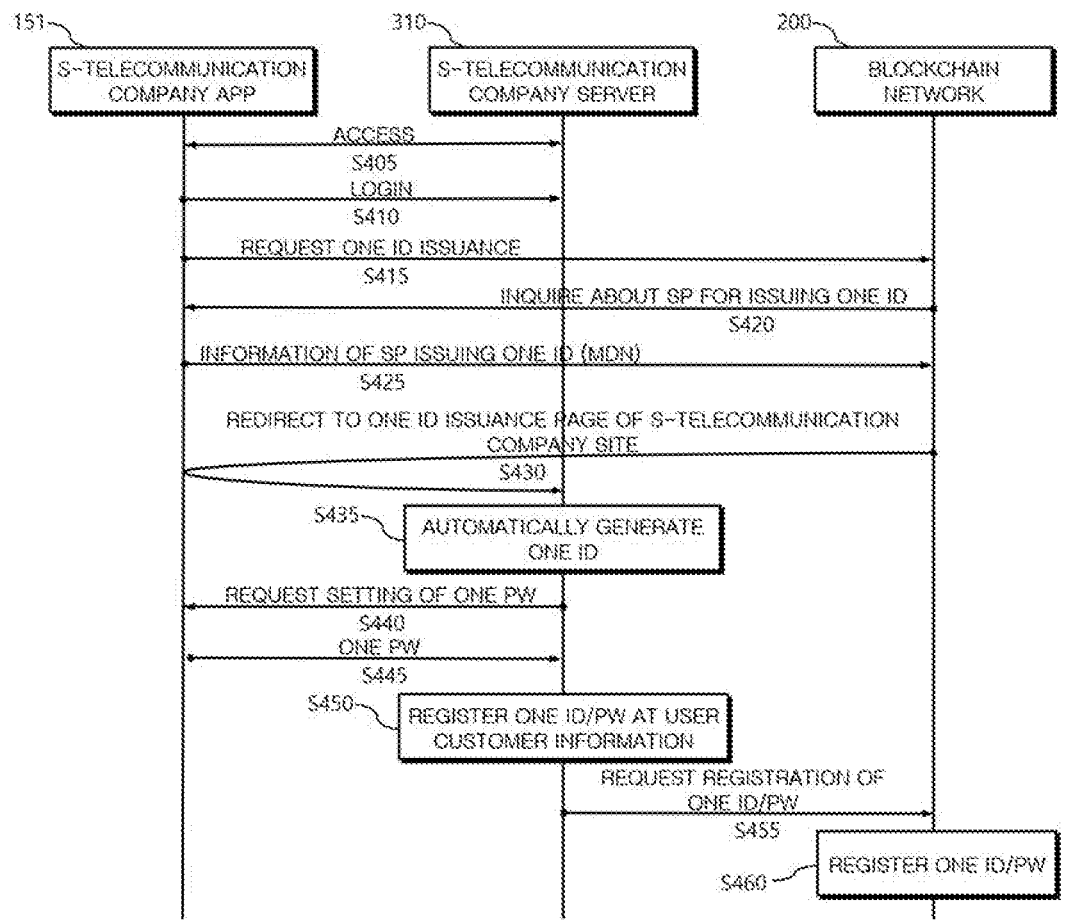
FIG. 2 is a sequence diagram provided to explain a process of performing a procedure of issuing/registering one ID in the system shown in FIG. 1.

FIG. 2 is a sequence diagram provided to explain a process of performing a procedure for issuing/registering one ID in the system shown in FIG. 1. For convenience of understanding and explanation, it is assumed in FIG. 2 that the user is issued one ID through an S-telecommunication company site to which the user has already subscribed.

To register the one ID, the S-telecommunication company App 151 executed in the mobile terminal 100 accesses the S-telecommunication company server 310 (S405), and logs in thereto (S410). Login authentication at step S410 is performed by the user entering the ID that has been issued by subscribing to the S-telecommunication company site, and a password (PW) to the S-telecommunication company App 151, and by the S-telecommunication company server 310 authenticating the ID and the PW.

Next, the S-telecommunication company App 151 requests the blockchain network 200 to issue one ID (S415). Step S415 is performed by the user pressing a button "Issue one ID" on a main page of the S-telecommunication company provided after the login, and by the S-telecommunication company App 151 being linked to the blockchain network 200 and requesting issuance of one ID.

The blockchain network 200 which is requested to issue the one ID through step S415 inquires of the S-telecommunication company App 151 about an SP for issuing the one ID (S420). At step S420, the blockchain network 200 provides a list of SPs that can issue the one ID (S-telecommunication company, A-shop, L-card).

In response to the inquiry, the S-telecommunication company App 151 returns a mobile device number (MDN) of the user to the blockchain network 200 along with information of an SP selected by the user (S425).

In the embodiment of the present disclosure, it is assumed that the one ID is issued through the S-telecommunication company. Therefore, on the response returned at step S425, "S-telecommunication company" is recorded as SP information. The MDN recorded on the response corresponds to information for specifying the user.

The blockchain network 200 redirects a session of the S-telecommunication company App 151 to a one ID issuance page of the S-telecommunication company server 310, while transmitting the MDN of the user to the S-telecommunication company server 310 through which the user wishes to be issued the one ID (S430).

Then, the S-telecommunication company server 310 automatically generates the one ID to be issued to the user (S435). Specifically, at step S435, the one ID may be generated by using the MDN of the user.

Furthermore, a country domain may be added to the MDN to generate a globally unique one ID. For example, if the phone number of a Korean user is 010-8888-9999, "01088889999@kr" is generated as one ID.

Next, the S-telecommunication company server 310 requests the S-telecommunication company App 151 to set one PW while transmitting the generated one ID to the S-telecommunication company App 151 (S440), and receives one PW set by the user through die S-telecommunication company App 151 (S445).

The S-telecommunication company server 310 additionally registers the one ID generated at step S435 and the one PW received at step S445 to customer information of the user existing in its own DB (S450). FIG. 3 illustrates a user customer information DB, and it can be seen that one ID and one PW are added to existing customer information, such as a name, an address, an MDN, a birth date.

Thereafter, the S-telecommunication company server 310 requests the blockchain network 200 to register the one ID and the one PW (S455). Then, the blockchain network 200 registers the requested one ID and one PW and the S-telecommunication company site which has issued the same at an ID-authentication site mapping DB (S460).

FIG. 4 illustrates the ID-authentication site mapping DB, and it can be seen that one ID issued at the S-telecommunication company according to the procedure shown in FIG. 2 is recorded. Since the one PW is not essential in the ID-authentication site mapping DB, the one PW may not be stored, and, if so, it may be more beneficial to security.

3. One ID Login

Figure 5:
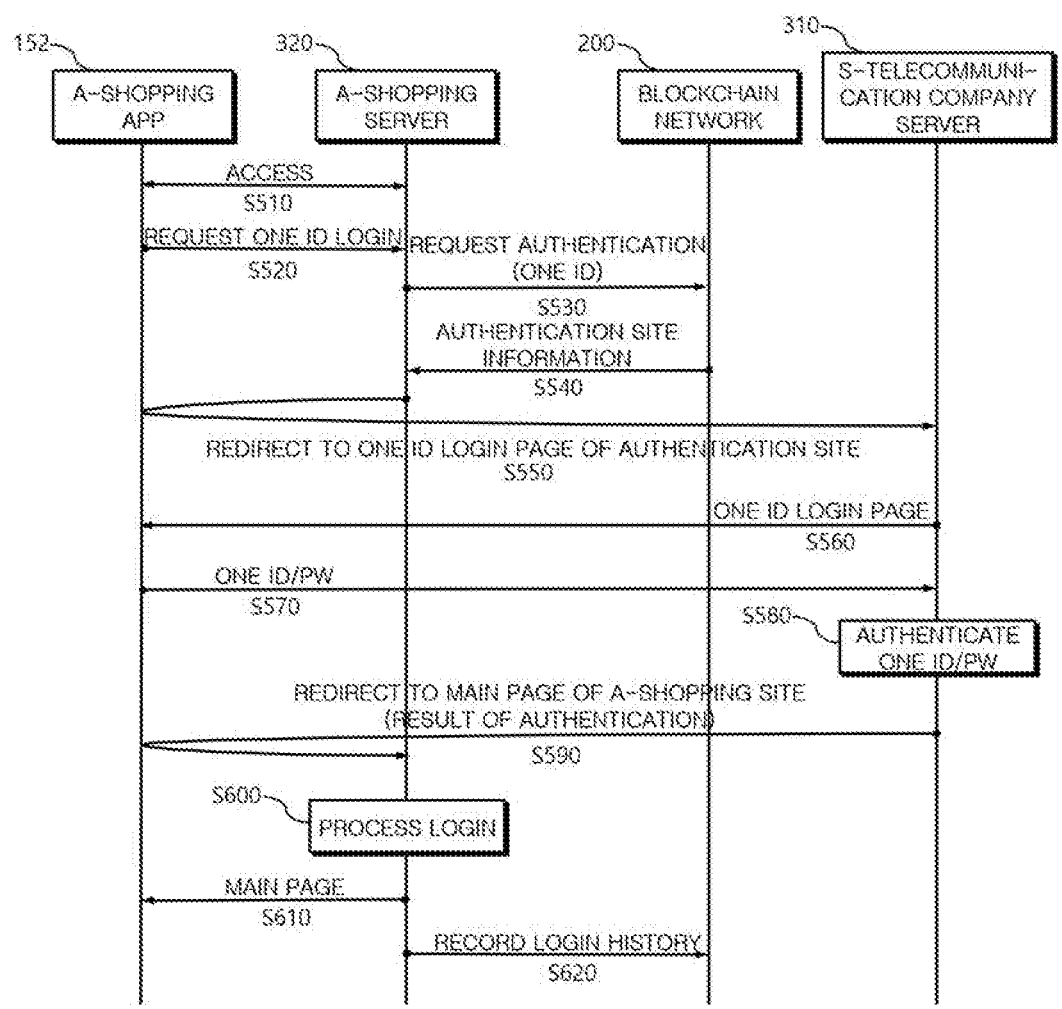
FIG. 5 is a sequence diagram provided to explain a process of logging in to an affiliated site by using one ID in the system shown in FIG. 1.

FIG. 5 is a sequence diagram provided to explain a process of logging in to an affiliated site by using one ID in the system shown in FIG. 1. For convenience of understanding and explanation, it is assumed in FIG. 5 that the user logs in to the A-shopping site that the user has not ever subscribed to, by using one ID issued through the S-telecommunication company site.

As shown in FIG. 5, the A-shopping application 152 executed in the mobile terminal 100 accesses the A-shopping server 320 (S510) and requests login by transmitting one ID (S520).

Figure 6:
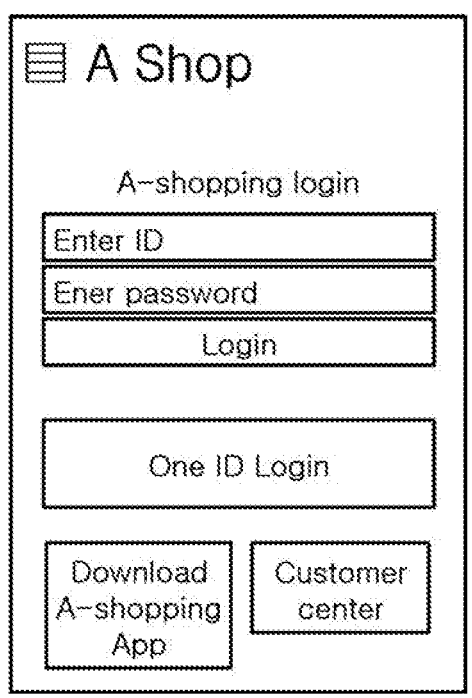
FIG. 6 is a view illustrating a login page of an A-shopping site.

If the one ID is implemented by an ID stored in a storage of the mobile terminal 100, the one ID of the user is not required to be entered for step S520, and the one ID may be automatically transmitted simply by pressing a button "one ID login" on a login page of the A-shopping site exemplified in FIG. 6.

The A-shopping server 320 which is requested to perform one ID login through step S520 requests authentication while transmitting the one ID transmitted at step S520 to the blockchain network 200 (S530).

Then, the blockchain network 200 grasps information regarding an authentication site which is mapped onto the one ID received at step S530 from the ID-authentication site mapping DB, and returns the information to the A-shopping server 320 (S540). The information regarding the authentication site returned at step S540 indicates the "S-telecommunication company site."

The A-shopping server 320 redirects a session of the A-shopping application 152 to a one ID login page of the S-telecommunication company site which is the authentication site returned at step S540 (S550).

In response to this, the S-telecommunication company server 310 transmits the one ID login page to the A-shopping application 152 (S560), and the one ID login page of the S-telecommunication company site is displayed on the A-shopping application 152.

Figure 7:
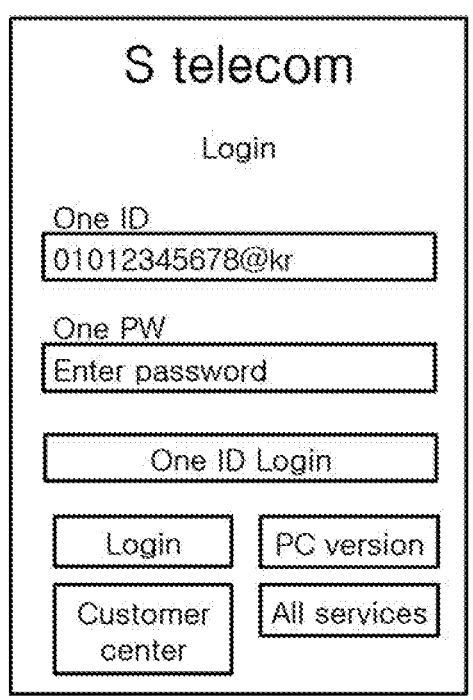
FIG. 7 is a view illustrating a one ID login page of an S-telecommunication company site.

FIG. 7 illustrates the one ID login page of the S-telecommunication company site. As shown in FIG. 7, since the one ID is stored in the mobile terminal 100, the one ID is automatically entered and the user has only to enter one PW.

The A-shopping application 152 transmits the one ID and the one PW to the S-telecommunication company server 310 (S570), and the S-telecommunication company server 310 performs a personal authentication procedure by using the one ID and the one PW (S580).

When authentication succeeds, the S-telecommunication company server 310 redirects the session of the A-shopping application 152 to a main page of the A-shopping site while transmitting the result of the authentication and customer information (name, address, MDN, birth date, etc.) (S590).

Accordingly, the A-shopping application 152 accesses the A-shopping server 320 again, and the result of the authentication and the customer information are transmitted to the A-shopping server 320. The A-shopping server 320 processes the login of the A-shopping application 152 (S600), and transmits the main page of the A-shopping site to the A-shopping application 152 (S610).

Figure 8:
FIG. 8 is a view illustrating a main page of the A-shopping site.

As a result, the main page of the A-shopping site is displayed on the A-shopping application 152, and FIG. 8 illustrates the main page of the A-shopping site.

Next, the A-shopping server 320 records a login history on the blockchain network 200 (S620). A login time and a login site are recorded at step S620, and may be recoded on the ID-authentication site mapping DB described above.

FIG. 9 illustrates a result of recording a login history after the user logs in to the A-shopping site and logs in to the L-card site with one ID.

4. MDN-Based One ID Auto Change

In the above-described embodiment, it is assumed that one ID is automatically generated by the S-telecommunication company server 310 adding the country domain to the MDN of the user. In this case, if the MDN of the user is changed, the one ID may be automatically changed in association with the change of the MDN.

FIG. 10 illustrates the case where the MDN of the user is changed in the customer information DB of the S-telecommunication company server 310. The S-telecommunication company server 310 recognizes that the changed MDN is different from the "MDN portion constituting one ID," and changes the MDN portion of the one ID to be consistent with the changed MDN of the user as shown in FIG. 11.

On the other hand, in the process of processing a one ID login authentication request from a server of an affiliate, the S-telecommunication company server 310 may recognize that the MDN is different from the "MDN portion constituting one ID" and may change the one ID.

When the one ID is changed, the S-telecommunication company server 310 should change the one ID registered at the blockchain network 200. FIG. 12 illustrates the situation where the one ID is changed in the ID-authentication site mapping DB of the blockchain network 200.

5. System Configuration 5.1 Mobile Terminal

Figure 13:
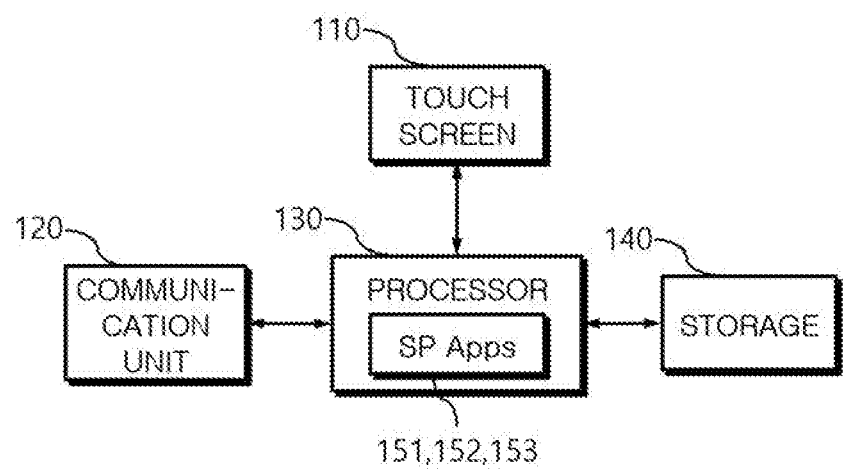
FIG. 13 is a detailed block diagram of a mobile terminal shown in FIG. 1.

FIG. 13 is a detailed block diagram of the mobile terminal 100 shown in FIG. 1. The mobile terminal 100 includes a touch screen 110, a communication unit 120, a processor 130, and a storage 140 as shown in FIG. 13.

The processor 130 executes the above-described APPs 151, 152, 153, and performs the procedures by the APPs 151, 152, 1532 from among the procedures shown in FIGS. 2 and 5. Instead of executing the APPs, the processor may access a site through a browser and may receive a service.

The touch screen 110 functions as a display to display an APP execution screen by the processor 130, and functions as an inputting means for transmitting a user input/command to the processor 130.

The communication unit 120 is a means for connecting communication with the SP servers 310, 320, 330, and the storage 140 provides a storage space necessary for operating the processor 130.

5.2 Blockchain Server

Figure 14:
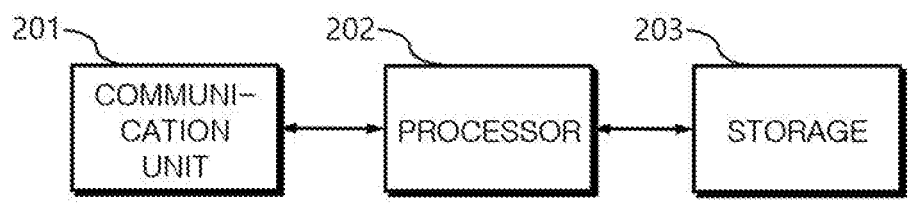
FIG. 14 is a detailed block diagram of a blockchain server show n in FIG. 1.

FIG. 14 is a detailed block diagram of the blockchain server shown in FIG. 1. The blockchain servers 210, 220, 230, 240 constituting the blockchain network 200 may have the same configurations and perform the same functions, and thus only one server is illustrated in FIG. 14 as a representative.

The blockchain server functioning as an authentication support server to support the authentication procedure by the SP servers 310, 320, 330 includes a communication unit 201, a processor 202, and a storage 203 as shown in FIG. 14.

The communication unit 201 is a means for connecting communication between the mobile terminal 100 and the SP servers 310, 320, 330.

The processor 202 performs the procedures by the blockchain network 200 from among the procedures shown in FIGS. 2 and 5. In the storage 203, the above-described ID-authentication site mapping DB is established.

In addition, the processor 202 transmits the established ID-authentication site mapping DB to the other blockchain servers constituting the blockchain network 200, and receives the ID-authentication site mapping DBs from the other blockchain servers and updates its own ID-authentication site mapping DB. Accordingly, the blockchain servers constituting the blockchain network 200 share the same ID-authentication site mapping DB in which all pieces of information are integrated.

5.3 SP Server

Figure 15:
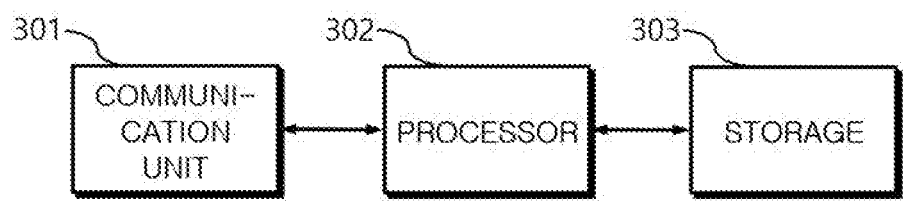
FIG. 15 is a detailed block diagram of tut SP server shown in FIG. 1.

FIG. 15 is a detailed block diagram of the SP server 310, 320, 330 shown in FIG. 1. The SP servers 310, 320, 330 perform the same functions with respect to the main components related to the embodiments of the present disclosure, and thus only one SP server is illustrated in FIG. 15 as a representative.

The SP sever includes a communication unit 301, a processor 302, and a storage 303 as shown in FIG. 15.

The communication unit 301 is a means for connecting communication between the mobile terminal 100 and the blockchain network 200. In the storage 303, the above-described customer information DB is established.

The processor 302 performs the procedures by the SP servers 310, 320, 330 from among the procedures shown in FIGS. 2 and 5 in relation to the embodiments of the present disclosure, in addition to providing a site for a service.

6. Variations

Up to now, the blockchain-based one ID service system and method have been described with reference to preferred embodiments.

In the above-described embodiments, it is assumed that the S-telecommunication company server 310 automatically generates and issues one ID by using the MDN of the user which is personal information owned by the S-telecommunication company server to provide a service. However, this is merely an example.

Servers of other SPs than the S-telecommunication company may automatically generate/issue one ID. That is, the L-card server 330 may automatically generate and issue one ID by using a card number of the user which is personal information owned by the L-card server.

The technical idea of the present disclosure can be extended to device authentication in addition to user authentication. That is, the technical idea of the present disclosure can be applied when an IoT device is authenticated.

The technical idea of the present disclosure may be applied to a computer-readable recording medium which records a computer program for performing functions of the apparatus and the method according to the present embodiment. In addition, the technical idea according to various embodiments of the present disclosure may be implemented in the form of a computer-readable code recorded on the computer-readable recording medium. The computer-readable recording medium may be any data storage device that can be read by a computer aid can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing front the scope of the present disclosure claimed in claims, and also, changed embodiments should not be understood as being separate from the technical idea or prospect of the present disclosure.

The invention claimed is:

1. An authentication method comprising:
mapping and registering, by an authentication supporting server, one ID issued to a first user by a first SP server from among a plurality of SP servers, and a first site of the first SP server which is an issuance server; and
when the authentication supporting server receives the one ID from a second SP server from among the plurality of SP servers, returning, by the authentication supporting server, information regarding the first site of the first SP server mapped onto the one ID to the second SP server,
redirecting, by the second SP server, a session of an application installed in a terminal of the first user to a one ID login page of the first site of the first SP server, wherein the application is an application for accessing a second site of the second SP server and using a service of the second site of the second SP server; and transmitting, by the first SP server, the one ID login page to the terminal.

2. The authentication method of claim 1, wherein the one ID is an ID which is used to log in to sites provided by the plurality of SP servers.

3. The authentication method of claim 2, wherein the first user is a member of the first site, but is not a member of the second site provided by the second SP server.

4. The authentication method of claim 2, wherein the first user is a member of the first site, and the first SP server is configured to automatically generate the one ID by using customer information of the first user owned by the first SP server.

5. The authentication method of claim 4, wherein, when the customer information of the first user used to generate the one ID is changed, the first SP server is configured to change the one ID according to the changed customer information, and
wherein the authentication method further comprises receiving, by the authentication supporting server, the changed one ID from the first SP server, and replacing the existing one ID with the changed one ID.

6. The authentication method of claim 1, further comprising registering, by the first SP server, the one ID and a PW set by the first user at a DB of the first SP server, and performing, by the first SP server, an authentication procedure for logging in to the second site of the second SP server using the one ID with reference to the DB.

7. The authentication method of claim 6, further comprising redirecting, by the first SP server, the session of the application in the terminal of the first user to the second site after performing the authentication procedure.

8. The authentication method of claim 7, further comprising transmitting, by the first SP server, customer information of the first user to the second SP server through the terminal of the first user which is redirected to the second site.

9. The authentication method of claim 1, further comprising recording, by the authentication supporting server, a login history using the one ID received from the second SP server.

10. The authentication method of claim 1, further comprising:
mapping and registering, by the authentication supporting server, an ID issued to a second user by the second SP server and a second site of the second SP server which is an issuance server; and
when the authentication supporting server receives the ID issued to the second user from the first SP server, returning information regarding the second site mapped onto the ID issued to the second user to the first SP server.

11. The authentication method of claim 1, wherein the authentication supporting server is a server constituting a blockchain network.

12. An authentication supporting server comprising:
a communication unit configured to connect communication with a plurality of SP servers; and
a processor configured to map and register one ID issued to a first user by a first SP server from among the plurality of SP servers, and first site of the first SP server which is an issuance server, and, when the one ID is received from a second SP server from among the plurality of SP servers through the communication unit, to return information regarding the first site mapped onto the one ID to the second SP server through the communication unit,
wherein the processor is further configured to:
receive a request for issuing the one ID from a terminal of the first user through the communication unit,
provide a list of SP servers that can issue the one ID to the terminal through the communication unit,
receive information of the first SP server among the list of SP servers selected by the first user, and
redirect a session of an application installed in the terminal to a one ID issuance page of the first SP server, wherein the application is an application for accessing the first site of the first SP server and using a service of the first site of the first SP server.

13. An authentication method comprising:
a terminal being issued one ID from a first SP server from among a plurality of SP servers; and
requesting, by the terminal, login to a second site of a second SP server from among the plurality of SP servers with the issued one ID,
wherein the one ID is mapped onto a first site of the first SP server which is an issuance server, and is registered at an authentication supporting server,
wherein the second SP server is configured to receive information regarding the first site of the first SP server mapped onto the one ID from the authentication supporting server, and to request the first site of the first SP server to perform authentication necessary for logging in to the second site of the second SP server,
wherein the method further comprises:
redirecting, by the second SP server, a session of an application installed in the terminal to a one ID login page of the first site of the first SP server, wherein the application is an application for accessing the second site of the second SP server and using a service of the second site of the second SP server, and
receiving, by the terminal, the one ID login page from the first SP server.

14. A terminal comprising:
a communication unit configured to connect communication with a plurality of SP servers; and
a processor configured to be issued one ID from a first SP server from among the plurality of SP servers, and to request login to a second site of a second SP server from among the plurality of SP servers with the issued one ID,
wherein the one ID is mapped onto a first site of the first SP server which is an issuance server, and is registered at an authentication supporting server,
wherein the second SP server is configured to receive information regarding the first site of the first SP server mapped onto the one ID from the authentication supporting server, and to request the first site of the first SP server to perform authentication necessary for logging in to the second site of the second SP server,
wherein the processor is configured to transmit a request for performing one ID login of the second site of the second SP server to the second SP server,
wherein a session of an application installed in the terminal is redirected to a one ID login page of the first site of the first SP server by the second SP server, wherein the application is an application for accessing the second site of the second SP server and using a service of the second site of the second SP server, and wherein the processor is configured to receive the one ID login page from the first SP server through the communication unit.

* * * * *